United States Patent
Yang et al.

(10) Patent No.: US 10,393,441 B2
(45) Date of Patent: Aug. 27, 2019

(54) COOLING TOWER DRIFT ELIMINATOR

(71) Applicant: SPX Cooling Technologies, Inc., Overland Park, KS (US)

(72) Inventors: Jidong Yang, Leawood, KS (US); Jason Stratman, Lee's Summit, MO (US); Eric Rasmussen, Overland Park, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 144 days.

(21) Appl. No.: 14/946,196

(22) Filed: Nov. 19, 2015

(65) Prior Publication Data

US 2016/0356549 A1    Dec. 8, 2016

Related U.S. Application Data

(60) Provisional application No. 62/169,889, filed on Jun. 2, 2015.

(51) Int. Cl.
| | | |
|---|---|---|
| *B01D 45/00* | (2006.01) | |
| *F28C 1/04* | (2006.01) | |
| *B01D 45/06* | (2006.01) | |
| *B01D 45/16* | (2006.01) | |
| *F28F 25/08* | (2006.01) | |
| *F28C 1/16* | (2006.01) | |
| *B01D 45/08* | (2006.01) | |

(Continued)

(52) U.S. Cl.
CPC ............... *F28C 1/04* (2013.01); *B01D 45/06* (2013.01); *B01D 45/08* (2013.01); *B01D 45/16* (2013.01); *B01J 19/30* (2013.01); *F28C 1/16* (2013.01); *F28F 25/08* (2013.01); *A47L 9/1683* (2013.01); *B01D 50/002* (2013.01)

(58) Field of Classification Search
CPC ... F28C 1/04; F28C 1/16; B01D 45/08; B01D 45/06; B01D 45/16; B01D 50/002; B01J 19/30; F28F 25/08; A47L 9/1683
See application file for complete search history.

(56) References Cited

U.S. PATENT DOCUMENTS

| | | | |
|---|---|---|---|
| 2,437,484 A | 3/1948 | Simons | |
| 2,479,625 A * | 8/1949 | Kimmell | ............... B01D 45/08 55/440 |

(Continued)

FOREIGN PATENT DOCUMENTS

| | | |
|---|---|---|
| CN | 1257992 A | 6/2000 |
| CN | 2573981 Y | 9/2003 |

(Continued)

*Primary Examiner* — Dung H Bui
(74) *Attorney, Agent, or Firm* — BakerHostetler (57) ABSTRACT

A drift eliminator to remove liquid from a flow of air in a cooling tower includes an eliminator inlet, a plurality of flutes, an eliminator ridge, and a plurality of ribs. The eliminator inlet is to receive the flow of air. The plurality of flutes are configured to convey the flow of air through the drift eliminator. The eliminator ridge has a first drift wall extending in a first direction and a second drift wall extending in a second direction. Each flute is in fluid communication with the eliminator ridge and is defined by a flute interior surface curving upwards from the flute inlet to a flute outlet. The plurality of ribs are defined by adjacent ones of the flutes and curving upwards toward the flute outlet.

21 Claims, 5 Drawing Sheets

(51) Int. Cl.
  *B01J 19/30* (2006.01)
  *B01D 50/00* (2006.01)
  *A47L 9/16* (2006.01)

(56) References Cited

U.S. PATENT DOCUMENTS

| | | | | | |
|---|---|---|---|---|---|
| 3,599,943 | A | * | 8/1971 | Munters | B01J 19/32 261/112.2 |
| 3,673,771 | A | * | 7/1972 | Dickey | B01D 45/08 415/121.2 |
| 3,917,764 | A | * | 11/1975 | Phelps | F28C 1/00 261/111 |
| 3,982,914 | A | | 9/1976 | Grimble | |
| 4,337,216 | A | * | 6/1982 | Korsell | F28C 1/04 261/112.2 |
| 4,508,552 | A | * | 4/1985 | Ovard | B01D 45/08 55/440 |
| 4,530,707 | A | * | 7/1985 | Ovard | B01D 45/06 55/440 |
| 4,548,766 | A | * | 10/1985 | Kinney, Jr. | F28C 1/04 261/112.2 |
| 4,553,993 | A | * | 11/1985 | Wigley | B01D 45/06 210/150 |
| 4,801,410 | A | * | 1/1989 | Kinney, Jr. | F28F 25/087 261/112.2 |
| 4,847,019 | A | * | 7/1989 | McNab | F28C 1/16 261/112.2 |
| 4,934,663 | A | * | 6/1990 | Phelps | F28C 1/04 261/112.2 |
| 5,269,823 | A | * | 12/1993 | Wurz | B01D 45/16 55/440 |
| 5,312,464 | A | * | 5/1994 | Gay | B01J 19/32 261/112.2 |
| 5,320,651 | A | * | 6/1994 | Drummond | B01D 45/16 261/112.2 |
| 5,427,718 | A | * | 6/1995 | Phelps | B01J 19/32 261/109 |
| 6,070,860 | A | * | 6/2000 | Kinney, Jr. | F28C 1/04 261/109 |
| 6,260,830 | B1 | * | 7/2001 | Harrison | F28C 1/04 261/112.2 |
| 2005/0120688 | A1 | * | 6/2005 | Shepherd | B01D 45/06 55/440 |
| 2009/0320689 | A1 | * | 12/2009 | Krell | B01D 1/305 96/299 |
| 2016/0108816 | A1 | * | 4/2016 | Zhang | C04B 35/565 165/185 |
| 2016/0258695 | A1 | * | 9/2016 | Akhavi | B01J 19/32 |

FOREIGN PATENT DOCUMENTS

CN 101021387 A 8/2007
DE 34 22 791 A1 1/1986
EP 1 004 839 A2 5/2000

* cited by examiner

COOLING TOWER DRIFT ELIMINATOR

CROSS REFERENCE TO RELATED APPLICATIONS

This application claims priority to U.S. Provisional Application Ser. No. 62/169,889, filed on Jun. 2, 2015, titled "DRIFT ELIMINATOR FOR CONDENSING COOLING TOWER EFFLUENT," the disclosure of which is incorporated herein by reference in its entirety.

FIELD OF THE INVENTION

The present invention relates generally to water reclamation from air entrained water in cooling tower effluent or other heat rejection devices. More particularly, the present invention relates to method and apparatus for reclaiming water from cooling tower air effluent to reduce drift in the cooling tower discharge air effluent.

BACKGROUND OF THE INVENTION

As is generally known, many processes generate waste heat. For example, in electricity generation using steam driven turbines, water is heated in a boiler to create steam which drives a turbine to create electricity. In order to minimize the amount of clean water necessary for this process, the steam must be converted back into water by removing the heat of vaporization, so that the water can be reused in the process. The heat removed from the steam is described as 'waste heat' because it is not useful in the production of energy. In another example, in air conditioning systems for large buildings, air inside the building is forced passed coils containing chilled water thereby transferring heat from inside the building into the water. The water is then cooled by the chiller in the evaporator by expansion of a refrigerant from liquid to gas which takes on heat. The warmed refrigerant gas is then compressed and sent to the condenser for cooling and liquefying. Heat is removed from the refrigerant in the condenser. Water cooled condensers transfer the heat rejected from the refrigerant to circulating water. The heated circulating water is in turn sent to the cooling tower where the heat is discharged into the atmosphere. After the refrigerant is liquefied and cooled, the refrigerant is ready to start the cycle anew. Again, this heat is described as waste heat because it is not useful in the refrigeration system and must be removed before the refrigerant is reused in the cooling process.

In both of the foregoing processes, and numerous other processes that require the step of dissipating excess heat, cooling towers have been employed. In wet type cooling towers, water is pumped passed a condenser coil containing the heated steam, refrigerant, or other heated liquid or gas, thereby transferring heat into the water. The warm water is then pumped to the top of the cooling tower and sprayed over a cooling tower fill media to increase the exposed surface area of the warm water and improve heat transfer and evaporation. The fill media is typically comprised of thin sheets of material or splash bars. As the warm water flows down through the fill media, ambient air traverses across the fill media passed the heated water and heat is transmitted from the water to the air by both sensible and evaporative heat transfer. During this process, the flow of air becomes warmer and more humid than the incoming ambient air. The warm, moist air is then forced out of, or exhausted from, the cooling tower and dissipated into the surrounding air. However, for a variety of reasons, it is not desirable to exhaust liquid water, typically in the form of mist or droplets that are called 'drift', along with the warm, moist exhaust air. For example, drift represents a loss of circulating water. In another example, in some atmospheric conditions, the drift may freeze on and adversely affect the operation of the components in the cooling tower or other nearby machines and structures.

While other steps can be taken to reduce the amount of drift from cooling towers, these steps are often insufficient and cause other problems. For example, slowing the speed of the flow of air may reduce drift but the tradeoff is increasing the volume of the fill media along with the size of the cooling tower. Placing a maze of baffles between the fill media and the cooling tower exhaust may also reduce drift. Unfortunately, the baffle may increase static pressure across the fill media requiring more powerful fans to draw the air through the cooling tower.

Accordingly, there is a need for reducing drift in cooling towers to address the problems described above and/or problems posed by other conventional approaches.

SUMMARY OF THE INVENTION

Embodiments of the present disclosure are capable of reducing drift in cooling towers, at least to some extent.

An embodiment of the invention pertains to a drift eliminator to remove liquid from a flow of air in a cooling tower. The drift eliminator includes an eliminator inlet, a plurality of flutes, an eliminator ridge, and a plurality of ribs. The eliminator inlet is to receive the flow of air. The plurality of flutes are configured to convey the flow of air through the drift eliminator. The eliminator ridge has a first drift wall extending in a first direction and a second drift wall extending in a second direction. Each flute is in fluid communication with the eliminator ridge and is defined by a flute interior surface curving upwards from the flute inlet to a flute outlet. The plurality of ribs are defined by adjacent ones of the flutes and curving upwards toward the flute outlet.

Another embodiment of the invention pertains to a fill media for a cooling tower. The fill media includes a fill inlet portion, a heat exchange portion, and a drift eliminator portion. The fill inlet portion is disposed at a first end of the fill media. The heat exchange portion includes a heat exchange inlet and a heat exchange passage. The heat exchange inlet is fluidly connected to the fill inlet portion. The heat exchange passage is defined by a pair of heat exchange sheets and configured to exchange heat from a flow of liquid to a flow of air passing through the heat exchange passage. The flow of liquid passes from a top of the fill media and down through the heat exchange passage and the flow of air enters the fill media via the fill inlet portion and is conveyed across the heat exchange portion. The drift eliminator portion is configured to remove liquid from the flow of air. The drift eliminator includes an eliminator inlet, a plurality of flutes, an eliminator ridge, and a plurality of ribs. The eliminator inlet is to receive the flow of air. The plurality of flutes are configured to convey the flow of air through the drift eliminator. The eliminator ridge has a first drift wall extending in a first direction and a second drift wall extending in a second direction. Each flute is in fluid communication with the eliminator ridge and is defined by a flute interior surface curving upwards from the flute inlet to a flute outlet. The plurality of ribs are defined by adjacent ones of the flutes and curving upwards toward the flute outlet.

Another embodiment of the invention relates to a cooling tower. The cooling tower includes a liquid supply system to generate a flow of liquid and a fill media. The fill media includes a fill inlet portion, a heat exchange portion, and a drift eliminator portion. The fill inlet portion is disposed at a first end of the fill media. The heat exchange portion includes a heat exchange inlet and a heat exchange passage. The heat exchange inlet is fluidly connected to the fill inlet portion. The heat exchange passage is defined by a pair of heat exchange sheets and configured to exchange heat from the flow of liquid to a flow of air passing through the heat exchange passage. The flow of liquid passes from a top of the fill media and down through the heat exchange passage and the flow of air enters the fill media via the fill inlet portion and is conveyed across the heat exchange portion. The drift eliminator portion is configured to remove liquid from the flow of air. The drift eliminator includes an eliminator inlet, a plurality of flutes, an eliminator ridge, and a plurality of ribs. The eliminator inlet is to receive the flow of air. The plurality of flutes are configured to convey the flow of air through the drift eliminator. The eliminator ridge has a first drift wall extending in a first direction and a second drift wall extending in a second direction. Each flute is in fluid communication with the eliminator ridge and is defined by a flute interior surface curving upwards from the flute inlet to a flute outlet. The plurality of ribs are defined by adjacent ones of the flutes and curving upwards toward the flute outlet.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The drawings presented are intended solely for the purpose of illustration and therefore, are neither desired nor intended to limit the subject matter of the disclosure to any or all of the exact details of construction shown, except insofar as they may be deemed essential to the claims.

DETAILED DESCRIPTION OF PREFERRED EMBODIMENTS OF THE INVENTION

Figure 1:
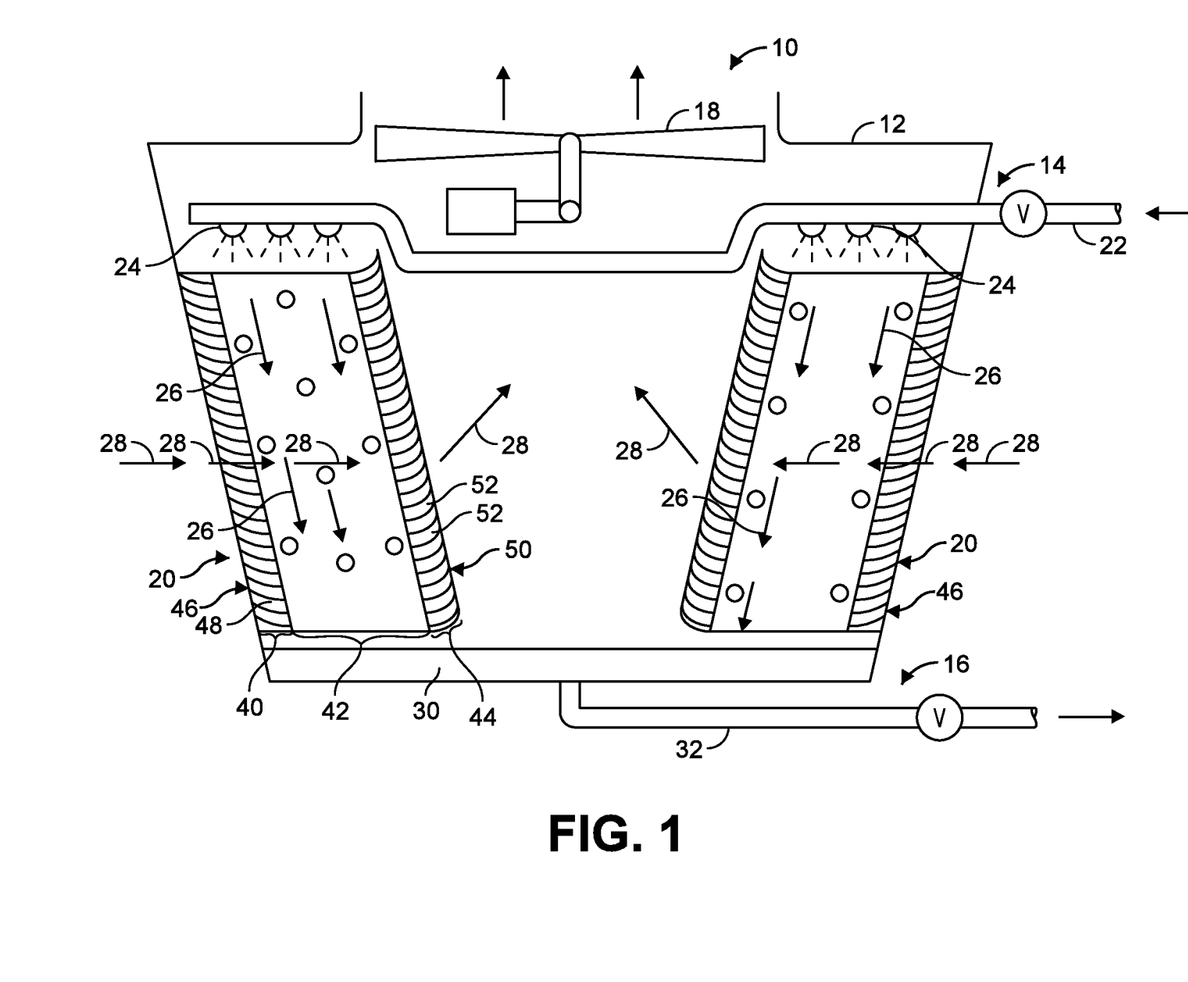
FIG. 1 is a cutaway view of a heat exchanger suitable for use with embodiment of the invention.

In general, embodiments of the invention pertain to a drift eliminator and method of eliminating drift from a flow of air. Although examples are presented herein of using the drift eliminator in a cooling tower, other applications in which liquid or particulate matter is removed from a fluid stream is within the purview of other embodiments of the invention. Referring now to the figures wherein like reference numerals indicate like elements, in FIG. 1 there is shown a cooling tower 10 for dissipating waste heat. The waste heat is dissipated by introducing a downward flow of water to a horizontal flow of air that absorbs the waste heat through a combination of sensible heat transfer and evaporative cooling. The cooling tower 10 includes a housing 12, water supply system 14, water collection system 16, fan 18 and fill media 20. As shown in FIG. 1, the water is conveyed to the cooling tower via a supply pipe 22 and introduced to the fill media 20 via a plurality of spray nozzles 24 or other such dispersion device such as a perforated tray or screen. As described herein, the fill media 20 includes planar passages for the passage of water and air (See FIG. 3). The water introduced at the top of the fill media 20 fall downward through these passages as a flow of water 26 and comes in contact with a horizontal flow of air 28. The flow of air is generated via the fan 18. Any liquid water remaining at the bottom of the fill media 20 drips into a collection basin 30 of the water collection system 16 and conveyed from the cooling tower 10 via a drain pipe 32.

The fill media 20 includes a fill inlet portion 40, heat exchange portion 42, and drift eliminator portion 44. The fill inlet portion 40 is disposed at an air inlet side 46 of the fill media 20. In order to reduce or prevent the water or other liquid from splashing out the fill media 20, the fill inlet portion 40 includes a series of louvers or baffles 48. Each of the baffles 48 is angled back toward the heat exchange portion 42 to reintroduce any errant water back into the heat exchange portion 42. The drift eliminator portion 44 is disposed at an air outlet side 50 of the fill media 20. As described herein, the drift eliminator portion 44 includes a plurality of drift eliminating elements configured to reduce or eliminate drift from exhausting from the fill media 20. For example, the drift eliminator portion 44 includes a series of ribs 52. These and other drift eliminating elements are described herein.

Figure 2:
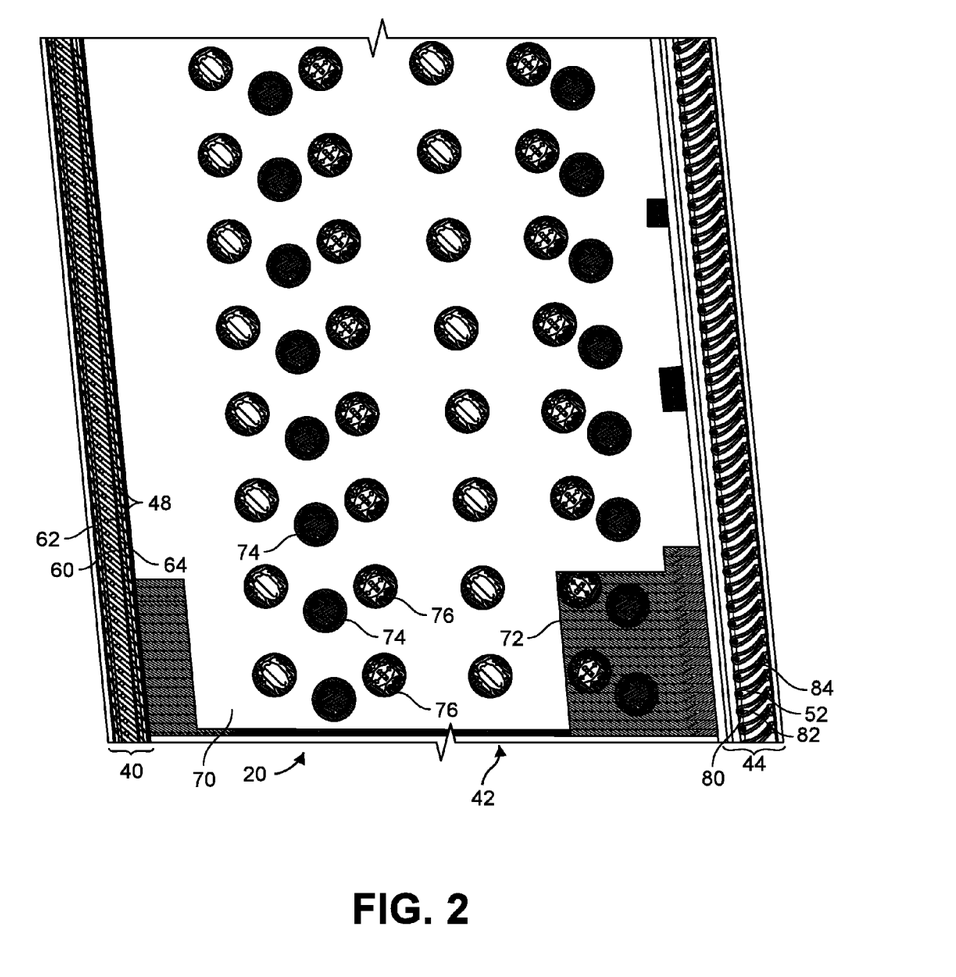
FIG. 2 is a side view of a fill media in accordance with an embodiment of the invention.

FIG. 2 is a side view of the fill media 20 in accordance with an embodiment of the invention. As shown in FIG. 2, the fill inlet portion 40 includes the series of louvers or baffles 48 and a series of baffle passages 60 with a baffle passage 60 being disposed between each adjacent pair of baffles 48. That is, the baffles 48 and baffle passages 60 alternate along the fill inlet portion 40. Each baffle passage 60 includes a baffle passage inlet 62 and baffle passage outlet 64. The baffle passage inlet 62 is disposed relatively higher than the corresponding baffle passage outlet 64 in order to redirect splashed water back into the heat exchange portion 42.

Figure 3:
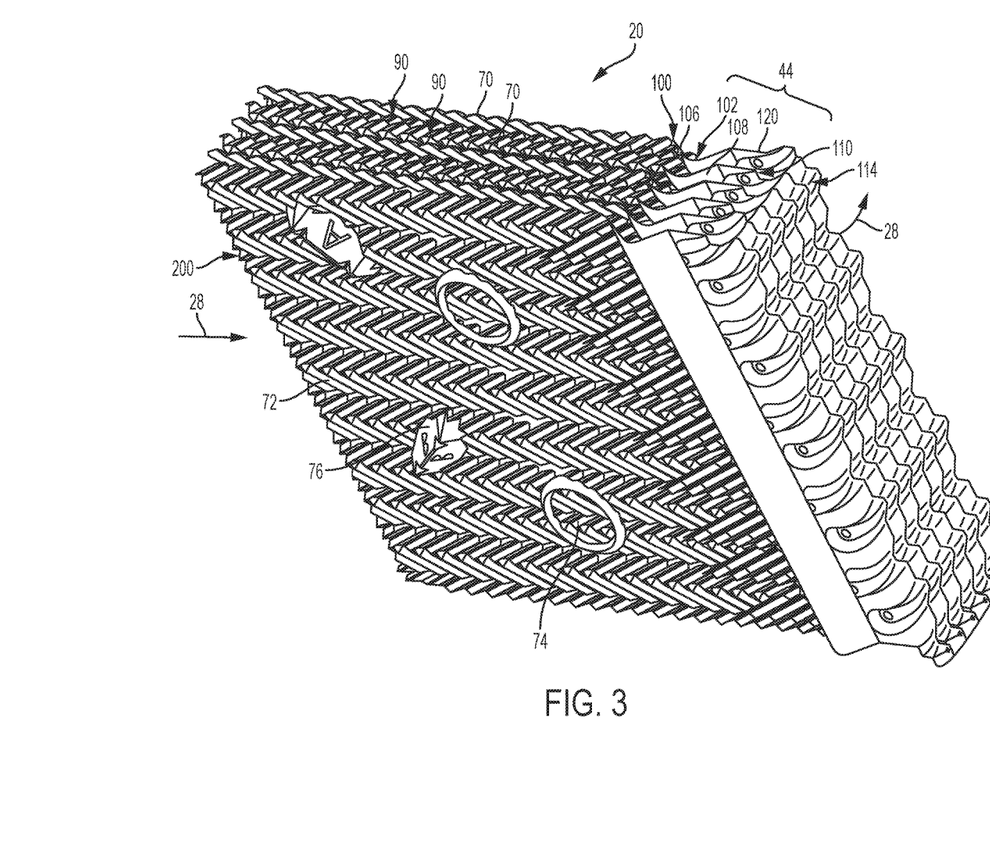
FIG. 3 is a perspective view of the fill media of FIG. 2.

As shown better in FIG. 3, the fill media 20 includes a plurality of sheets 70. The sheets 70 may include any suitable material for forming the sheets 70. In general, suitable materials include polymers, metals, or other formable materials that are sufficiently robust. Returning to FIG. 2, a portion of a particular sheet 70 is shown. Stamped or formed into the sheet 70, the heat exchange portion 42 includes a chevron field 72, tube sockets 74, and standoffs 76 (see also FIG. 3). The chevron field 72 is configured to facilitate mixing of air and water by introducing turbulence or non-laminar flow of the water and air. In addition, to the extent the water sheets down the surface of the sheet 70, the chevron field 72 increases the surface area. The tube sockets 74 optionally provide an attachment point for the sheet 70 to the housing 12 of the cooling tower 10. If utilized, one or more tube sockets 74 may be drilled or punched to generate a passage through the fill media 20. A tube or pipe (not shown) may be disposed therethrough to support the fill media 20. The standoffs 76 are utilized to maintain the spacing between the sheets 70 (Shown in FIG. 2).

Also shown in FIG. 2, the drift eliminator portion 44 includes the ribs 52. The ribs 52 may be continuously curved and/or airfoil shaped. In a particular example, each rib 52 may include a rounded forward edge 80 with a forward portion 82 that is relatively thicker and tapers down to an aft portion 84. This shape of the rib 52 facilitates directing the flow of air 28 upwards toward the fan 18 (shown in FIG. 1), and/or reducing the static pressure across the drift eliminator portion 44 by recovering energy from the flow of air 28 by gradual expansion of air in the tapering of rib 52 in particularly the aft portion 84. Gradual expansion of the air slows the velocity of the air and reduces the pressure loss at outlet 50.

It is an advantage of the lower static pressure that, all other factors being the same (e.g., fan rating, fill volume, etc.) the velocity of flow of air 28 may be about 5% greater in comparison to conventional drift eliminators that lack the ribs 52. Greater velocity in the flow of air 28 results in an increase in cooling capacity. In addition or alternatively, the ribs 52 facilitates the use of the fan 18 that may have a lower power rating or use less energy while maintaining the cooling capacity of a conventional cooling tower with a conventional drift eliminator that lacks the ribs 52. By using the fan 18 with a lower power rating, energy usage is lowered.

Referring to FIGS. 2 and 3, the fill inlet portion 40 (shown in FIG. 2), the heat exchange portion 42 having a heat exchange inlet 200, and the drift eliminator portion 44 are all integral to the sheet 70 and the fill media 20 more generally. That is, these portions are all formed from a single sheet of material and the formed sheets 70 are then stacked to form the fill media 20. As such, assembly of the fill media 20 is relatively straight forward. However, in other embodiments, the drift eliminator portion 44 may be added to an existing fill media. For example if an existing fill media has insufficient drift elimination, the drift eliminator portion 44 may be added to the existing fill media.

FIG. 3 is a perspective view of a back portion of the fill media 20 of FIG. 2. As shown in FIG. 3, the fill media 20 includes the plurality of sheets 70, or heat exchange sheets generating a series of heat exchange passages 90. These heat exchange passages 90 are generally planar to facilitate the downward flow of water and the horizontal flow of air and the intermixing of these two flows. As already discussed, the flow of air 28 flows generally across the heat exchange portion 42 and then through the drift eliminator portion 44 prior to exhausting from the fill media 20. The drift eliminator portion 44 is configured to remove any entrained water droplets or mist by causing the flow of air 28 to execute a series of turns. Because the water droplets have greater mass than air and water molecules, the droplets strike and adhere to surfaces and then sheet down these surfaces to drip into the collection basin 30 shown in FIG.

Figure 4:
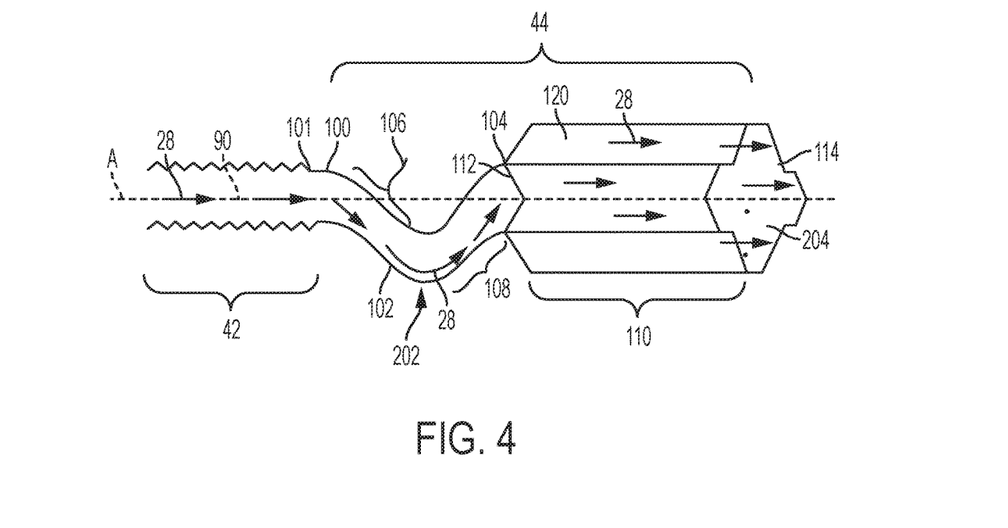
FIG. 4 is a top view of a portion of the fill media of FIG. 2.
Figure 5:
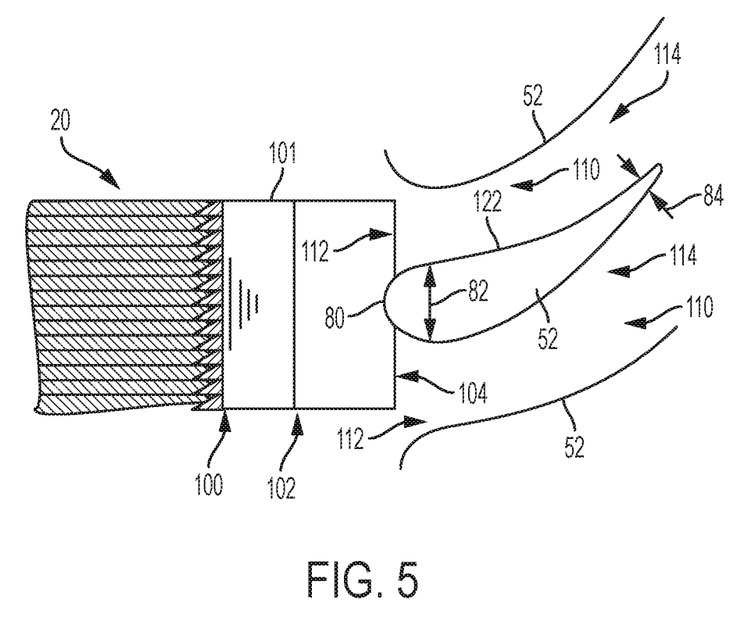
FIG. 5 is a cutaway side view of a portion the fill media of FIG. 2 showing an eliminator in a drift eliminator portion of the fill media.

Referring now to FIGS. 4 and 5, the drift eliminator portion 44 includes a plurality of curved portions and drift walls that work together to re-direct the flow of air 28 and remove entrained water (drift). Specifically, the drift eliminator portion 44 includes a first curved portion 100, a second curved portion 102, and a third curved portion 104. The first curved portion 100 curves toward a first side of the fill media 20 and the second curved portion 102 curves back toward the other side of the fill media 20. The third curved portion 104 curves back in line with the plane of the heat exchange passage 90 and also curves upward with the curve of the ribs 52. The drift eliminator portion 44 further includes a first drift wall 106, a second drift wall 108, a third drift wall 120 and a fourth drift wall 122. The first drift wall 106 is disposed between the first curved portion 100 and the second curved portion 102. The second drift wall 108 is disposed between the second curved portion 102 and the third curved portion 104. Together, the first drift wall 106, second curved portion 102, and second drift wall 108 form a generally V-shape geometry to form a "V" shaped ridge or eliminator ridge generally designated 202. The apex of this V occurs at the intersection of the first drift wall 106 and second drift wall 108 which is at the second curved portion 102. The aforementioned V shaped ridge offers a gradual divergence of the flow of air 28 while allowing the recovery of energy of the flow of air, reducing the likelihood of pressure drop.

Referring now to FIGS. 3-5, as the flow of air 28 enters the drift eliminator portion 44, the flow of air 28 is urged to follow the curved of the first curved portion 100 while the entrained liquid water, having more mass, turns more slowly and strikes the first drift wall 106. The surface of the first drift wall 106 is sufficiently hydroscopic that the water adheres to the first drift wall 106. Once sufficient water has accumulated on the first drift wall 106, the water drips or sheets down the first drift wall 106. In this regard, the first drift wall 106 acts as a drain surface or drain channel to facilitate the flow of water down and to the collection basin 30. Entrained liquid water that is not removed at the first drift wall 106 continues along with the flow of air 28 which is then urged to curve at the second curved portion 102. Here again, the more massive water droplets turn more slowly and strike and adhere to the second drift wall 108. As before, the surface of the second drift wall 108 is sufficiently hydroscopic that the water adheres to the second drift wall 108. Once sufficient water has accumulated on the second drift wall 108, the water drips or sheets down the second drift wall 108. In this regard, the second drift wall 108 acts as a drain surface or drain channel to facilitate the flow of water down and to the collection basin 30.

At the third curved portion 104, the flow of air 28 is curved back in line with the plane of the heat exchange passage 90 and the air enters a flute 110 via a flute inlet 112 and eventually exits or exhausts via a flute outlet 114. As illustrated in FIG. 3, the flutes comprise a plurality of flutes having at least first 110, second 110, third flutes and fourth flutes 110. As the flow of air enters the flutes 110, the mass of the moving entrained liquid water may carry the particles into the third drift wall 120 while the flow of air 28 continues through the flute 110 and is re-directed upwards by the rib 52. Here again, the mass of the moving entrained liquid water may carry the particles into the fourth drift wall 122 while the flow of air 28 continues up and out the flute 110 via the flute outlet 114. The flute 110 is defined by the wall of the flute that curve upward from the flute inlet 112 to the flute outlet 114. The flute inlet 112 is disposed relatively below the flute outlet 114 and the flute 110 sweeps upward in a continuous curve.

The eliminator inlet 101 is also depicted in FIG. 4 adjacent the heat exchange portion 42. The flute inlet 112 is also illustrated in FIG. 5. Turning back to FIG. 4, a plane A, or eliminator plane, is illustrated along which the flutes 110 extend and the stream of air flows. In the particular example shown in FIG. 4, the plane A may generally be defined as a plane residing between two adjacent sheets 70 and, more particularly, as a plane residing along a mid-point plane between the two adjacent sheets 70. As shown in FIG. 4, the V-shaped ridge formed by the first drift wall 106, second curved portion or apex wall 102, and second drift wall 108 diverts the flow of air from the plane A and then, the third curved portion 104 diverts the flow of air back parallel to the plane A at the flute inlet 112.

In some examples, the third curved portion 104 may be omitted. That is, the third curved portion 104 is optional. If the third curved portion 104 is included, the flutes 110 may be generally disposed along the plane A shown in FIG. 4. If the third curved portion 104 is omitted, the flutes 110 may continue along the line defined by the second drift wall 108 shown in FIG. 4. In the example in which the third curved portion 104 is omitted, the plane A may be define as a plane residing along a line between the flute inlet 112 and the flute outlet 114 and in alignment with the flutes 110 defined by two adjacent sheets 70.

FIG. 5 is a cutaway side view of a portion the fill media 20 of FIG. 2 showing the rib 52 in the drift eliminator portion 44 of the fill media 20. As shown in FIG. 5, the rib 52 includes the rounded forward edge 80 with the forward portion 82 that is relatively thicker and tapers down to the aft portion 84. The shape of the rib 52 is aerodynamic to reduce the turning pressure drop and/or expansion pressure. In this manner, the flow of air 28 is re-directed upwards with comparatively greater velocity than if the rib 52 were a flat plane. Also shown in FIG. 5, the rib 52 is defined by adjacent ones of the flute 110. That is, the rib 52 is disposed between the flutes 110 that are above and below the rib 52 and the geometry of the rib 52 is dictated by the walls of the adjacent flutes 110. As described above, upon entering the flute 110, the flow of air enters the flute 110, the mass of the moving entrained liquid water in the flow of air 28 may carry the water particles into the third drift wall 120 while the flow of air 28 continues through the flute 110 and is re-directed upwards by the rib 52. Here again, the mass of the moving entrained liquid water may carry the particles into the fourth drift wall 122 while the flow of air 28 continues up and out the flute 110 via the flute outlet 114.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A drift eliminator to remove liquid from a flow of air in a cooling tower, the drift eliminator comprising:
   a plurality of sheets, each sheet of the plurality of sheets extends between a top of the drift eliminator and a bottom of the drift eliminator;
   a vertical plane defined by a plane disposed between two adjacent ones of the plurality of sheets;
   an eliminator inlet to receive the flow of air, the eliminator inlet being disposed along the vertical plane and extending from the top of the drift eliminator to the bottom of the drift eliminator;
   a plurality of flutes configured to convey the flow of air through the drift eliminator, the plurality of flutes being disposed along the vertical plane and each flute of the plurality of flutes extending from the top of the drift eliminator to the bottom of the drift eliminator;
   an eliminator ridge being disposed along the vertical plane and extending from the top of the drift eliminator portion to the bottom of the drift eliminator portion, the eliminator ridge having a first drift wall extending in a first direction across the vertical plane and away from a first face of the vertical plane and the eliminator ridge having a second drift wall extending across the vertical plane again in a second direction and away from second face of the vertical plane, wherein at least a first flute of the plurality of flutes is in fluid communication with the eliminator ridge, at least a second flute of the plurality of flutes being defined by a flute interior surface curving upwards from a flute inlet to a flute outlet; and
   a plurality of ribs defined by adjacent flutes of the plurality of flutes, each rib of the plurality of ribs having a rib width extending perpendicularly relative to the vertical plane and having a rib length curving upwards toward the top of the drift eliminator, each rib of the plurality of ribs being an airfoil defined by a rounded forward portion and continuously tapering to an aft edge wherein the plurality of flutes define an eliminator plane; wherein at least one flute of the plurality of flutes includes a respective third drift wall disposed parallel to the eliminator plane and a respective fourth drift wall disposed upon an upper surface of a rib of the plurality of ribs.

2. The drift eliminator according to claim 1, wherein at least one of the ribs is an airfoil, at least one of the ribs includes a forward portion proximal to the eliminator ridge and at least one of the ribs includes an aft portion proximal to the flute outlet, the forward portion being relatively thicker and tapering towards the aft portion.

3. The drift eliminator according to claim 1, wherein the first drift wall extends out from the eliminator plane and the second drift wall extends back toward the eliminator plane.

4. The drift eliminator according to claim 1, wherein at least one eliminator ridge has a V-shaped geometry.

5. The drift eliminator according to claim 4, wherein the first drift wall and the second drift wall are connected by a curved apex wall.

6. A fill media for a cooling tower, the fill media comprising:
   a fill inlet;
   a heat exchange portion, the heat exchange portion including:
      a heat exchange inlet fluidly connected to the fill inlet portion; and
      a heat exchange passage defined by a pair of heat exchange sheets and configured to exchange heat from a flow of liquid to a flow of air passing through the heat exchange passage, wherein the flow of liquid passes from a top of the fill media and down through the heat exchange passage and wherein the flow of air enters the fill media via the fill inlet portion and is conveyed across the heat exchange portion; and
   a drift eliminator portion configured to remove liquid from the flow of air, the drift eliminator including:

a plurality of sheets, each sheet of the plurality of sheets extends between a top of the drift eliminator and a bottom of the drift eliminator;
a vertical plane defined by a plane disposed between two adjacent ones of the plurality of sheets;
an eliminator inlet to receive the flow of air, the eliminator inlet being disposed along the vertical plane and extending from the top of the drift eliminator to the bottom of the drift eliminator;
a plurality of flutes configured to convey the flow of air through the drift eliminator, the plurality of flutes being disposed along the vertical plane and each flute of the plurality of flutes extending from the top of the drift eliminator to the bottom of the drift eliminator;
an eliminator ridge being disposed along the vertical plane and extending from the top of the drift eliminator portion to the bottom of the drift eliminator portion, the eliminator ridge having a first drift wall extending in a first direction across the vertical plane and away from a first face of the vertical plane and the eliminator ridge having a second drift wall extending across the vertical plane again in a second direction and away from second face of the vertical plane, wherein at least a first flute of the plurality of flutes is in fluid communication with the eliminator ridge, at least a second flute of the plurality of flutes being defined by a flute interior surface curving upwards from a flute inlet to a flute outlet; and
a plurality of ribs defined by adjacent flutes of the plurality of flutes, each rib of the plurality of ribs having a rib width extending perpendicularly relative to the vertical plane and having a rib length curving upwards toward the top of the drift eliminator, each rib of the plurality of ribs being an airfoil defined by a rounded forward portion and continuously tapering to an aft edge wherein the plurality of flutes define an eliminator plane; wherein at least one flute of the plurality of flutes includes a third drift wall disposed parallel to the eliminator plane and a fourth drift wall disposed upon an upper surface of a rib of the plurality of ribs.

7. The fill media according to claim 6, wherein the first drift wall extends out from the eliminator plane and the second drift wall extends back toward the eliminator plane.

8. The fill media according to claim 6, wherein at least one of the ribs is an airfoil and at least one of the ribs includes a forward portion proximal to the eliminator ridge and at least one of the ribs includes an aft portion proximal to the flute outlet, the forward portion being relatively thicker and tapering towards the aft portion.

9. The fill media according to claim 6, wherein at least one eliminator ridge has a V-shaped geometry.

10. The fill media according to claim 9, wherein the first drift wall and the second drift wall are connected by a curved apex wall.

11. The fill media according to claim 6, wherein the fill inlet portion includes a series of fill inlet passages, at least one of the fill inlet passages having a fill inlet passage inlet and a fill inlet passage outlet disposed relatively below the fill inlet passage inlet.

12. The fill media according to claim 6, wherein the drift eliminator portion is integral to the fill media.

13. A cooling tower comprising:
a liquid supply system to generate a flow of liquid; and
a fill media including:
 a fill inlet;
 a heat exchange portion, the heat exchange portion including:
  a heat exchange inlet fluidly connected to the fill inlet portion; and
  a heat exchange passage defined by a pair of heat exchange sheets and configured to exchange heat from the flow of liquid to a flow of air passing through the heat exchange passage, wherein the flow of liquid passes from a top of the fill media and down through the heat exchange passage and wherein the flow of air enters the fill media via the fill inlet portion and is conveyed across the heat exchange portion; and
a drift eliminator portion configured to remove liquid from the flow of air, the drift eliminator portion including:
 a plurality of sheets, each sheet of the plurality of sheets extends between a top of the drift eliminator portion and a bottom of the drift eliminator portion;
 a vertical plane defined by a plane disposed between two adjacent ones of the plurality of sheets;
 a drift eliminator inlet fluidly connected to the heat exchange passage, the drift eliminator inlet being disposed along the vertical plane and extending from the top of the drift eliminator portion to the bottom of the drift eliminator portion, the drift eliminator portion comprising:
  a plurality of flutes configured to convey the flow of air through the drift eliminator, the plurality of flutes being disposed along the vertical plane and each flute of the plurality of flutes extending from the top of the drift eliminator portion to the bottom of the drift eliminator portion;
  an eliminator ridge being disposed along the vertical plane and extending from the top of the drift eliminator portion to the bottom of the drift eliminator portion, the eliminator ridge having a first drift wall extending in a first direction across the vertical plane and away from a first face of the vertical plane and the eliminator ridge having a second drift wall extending across the vertical plane again in a second direction and away from second face of the vertical plane, wherein at least a first flute of the plurality of flutes is in fluid communication with the eliminator ridge, at least a second flute of the plurality of flutes being defined by a flute interior surface curving upwards from a flute inlet to a flute outlet; and
  a plurality of ribs defined by adjacent flutes of the plurality of flutes, each rib of the plurality of ribs having a rib width extending perpendicularly relative to the vertical plane and having a rib length curving upwards toward the top of the drift eliminator portion, each rib of the plurality of ribs being an airfoil defined by a rounded forward portion and continuously tapering to an aft edge wherein the plurality of flutes define an eliminator plane; wherein at least one flute of the plurality of flutes includes a third drift wall disposed parallel to the eliminator plane and a fourth drift wall disposed upon an upper surface of a rib of the plurality of ribs.

14. The cooling tower according to claim 13, wherein the first drift wall extends out from the eliminator plane and the second drift wall extends back toward the eliminator plane.

15. The cooling tower according to claim 13, wherein at least one of the ribs is an airfoil and at least one of the ribs includes a forward portion proximal to the eliminator ridge and at least one of the ribs includes an aft portion proximal to the flute outlet, the forward portion being relatively thicker and tapering towards the aft portion.

16. The cooling tower according to claim 13, wherein the eliminator ridge has a V-shaped geometry.

17. The cooling tower according to claim 16, wherein the first drift wall and the second drift wall are connected by a curved apex wall.

18. The cooling tower according to claim 13, further comprising a fan to generate the flow of air across the fill media.

19. The cooling tower according to claim 13, further comprising a liquid collection system disposed below the fill media to collect the flow of liquid.

20. The cooling tower according to claim 13, wherein the fill inlet portion includes a series of fill inlet passages, at least one fill inlet passage having a fill inlet passage inlet and a fill inlet passage outlet disposed relatively below the fill inlet passage inlet.

21. The cooling tower according to claim 13, wherein the drift eliminator portion is integral to the fill media.

\* \* \* \* \*